United States Patent [19]

Sasshofer et al.

[11] 4,025,598

[45] May 24, 1977

[54] METHOD OF PRODUCING THREADS OR FIBERS OF SYNTHETIC MATERIALS

[75] Inventors: Franz Sasshofer, Ried i.I.; Friedrich Gotschy, Vocklabruck; Johannes Krässig, Seewalchen; Adalbert Wimmer, Vocklabruck, all of Austria

[73] Assignee: Chemigfaser Lenzing Aktiengesellschaft, Lenzing, Austria

[22] Filed: Dec. 18, 1975

[21] Appl. No.: 642,016

[30] Foreign Application Priority Data

Jan. 3, 1975 Austria .................................. 20/75

[52] U.S. Cl. .................................... 264/140; 82/56; 264/157; 264/158; 264/290 R

[51] Int. Cl.² ........................................... B29D 7/18

[58] Field of Search ............... 264/158, 147, 290 R, 264/140, 146, 138, 139, 157; 425/327, 294; 82/56

[56] References Cited

UNITED STATES PATENTS

| | | | |
|---|---|---|---|
| 1,756,172 | 4/1930 | Bommer | 82/56 |
| 1,951,853 | 3/1934 | Walsh | 264/158 |
| 2,158,086 | 5/1939 | Roberts et al. | 264/158 |
| 2,642,625 | 6/1953 | Peck | 264/288 |
| 2,728,950 | 1/1958 | Annesser | 264/147 |
| 3,198,860 | 8/1965 | Kimmel et al. | 264/158 |
| 3,348,264 | 10/1967 | Rice et al. | 425/327 |
| 3,524,789 | 8/1970 | Olsen | 264/158 |
| 3,676,243 | 7/1972 | Sasshofer et al. | 156/167 |
| 3,869,831 | 3/1975 | Gibb | 264/147 |

FOREIGN PATENTS OR APPLICATIONS

| | | | |
|---|---|---|---|
| 1,358,395 | 7/1974 | United Kingdom | 264/158 |

*Primary Examiner*—Jay H. Woo
*Attorney, Agent, or Firm*—Brumbaugh, Graves, Donohue & Raymond

[57] ABSTRACT

A method of producing threads and fibers of synthetic materials uses a cylindrically-shaped body of the synthetic material which is allowed to rotate against a scratching tool and a peeling knife arranged to follow the scratching tool in the direction of rotation. The peeled-off curtain of parallel threads is stretched, possibly while being simultaneously heated, and possibly the threads are cut to form a staple fiber or are ground to a short-staple floccule. A device for carrying out the aforementioned method, has a turning mechanism, a foil-peeling knife secured to a carriage of the turning mechanism, and a scratching tool arranged to precede the peeling knife.

12 Claims, 4 Drawing Figures

METHOD OF PRODUCING THREADS OR FIBERS OF SYNTHETIC MATERIALS

BACKGROUND OF THE INVENTION

The invention relates to a method of producing threads and fibers of synthetic materials, in particular materials of high-melting or non-melting polymers, e.g. difficult-to-dissolve or insoluble polymers, such as polytetrafluorethylene.

The known melting-spinning methods or dissolving-spinning methods are not suited for the production of fibers or threads from high-melting or non-melting polymers or from difficult-to-dissolve or insoluble polymers, respectively. Fibers and threads of such polymers are, however, in many cases of great technical interest because of their specific properties. Fibers and threads of polytetrafluorethylene are, for example, remarkable for their high resistivity to temperature and chemicals, as well as for their extremely low adhesion-friction coefficient. Therefore these fibers and threads despite their relatively high costs, are used in the production of special technical articles, such as interwoven sealing packages for stuffing boxes, textures and felts for the filtration of aggressive gases or liquids.

Threads of polytetrafluorethylene are customarily produced in a suspension or matrix-spinning procedure, in which the finest particles of the polymer are suspended in a viscose liquid, e.g. an alkaline solution of sodium-cellulose-xanthate, and are spun together with this liquid. After spinning the cellulose threads are subjected to a thermal treatment in which the matrix disintegrates and the polytetrafluorethylene particles sinter together. Thus stretchable threads are obtained. Originally their color is dark-brown due to carbon residues, but by a special bleaching procedure the threads may be changed into a light-colored product, with a corresponding loss of rigidity.

Austrian Pat. No. 290,710 describes a method of continuously producing fibers and threads of a polymer foil. According to this method a foil is split up into threads by means of cutting tools arranged transverse to the running direction of the foil, while the foil is stretched at the same time. The foils may be produced in a manner known per se, e.g. in the case of polytetrafluorethylene they may be produced by paste extrusion or by peeling cylindrical sintered blocks of polytetrafluorethylene.

SUMMARY OF THE INVENTION

It is the object of the present invention to avoid the disadvantages of known methods of making threads and fibers, to achieve threads and fibers with uniformly fine single thread thicknesses and to increase the economy and operational reliability of the method. According to the invention this object is achieved in that a cylindrically-shaped body of the synthetic material is allowed to rotate against a scratching tool that is provided with a certain number of scratching edges, and also against a peeling knife arranged to follow the scratching tool, in the rotating direction. Next the curtain of peeled-off parallel threads is stretched in one step or in several steps, possibly while being simultaneously heated, and then the threads may possibly be cut to staple fibers or ground to short-staple flock or floccule, i.e. extremely short fibers (e.g. 1–3 mm). The method of the invention is remarkable for being particularly simple, for avoiding melting and dissolution processes and for making it possible to do without complicated machinery.

The scratching tool, arranged to lie in front of the line of application of the peeling knife, scratches the surface of the rotating cylindrically-shaped body of synthetic material in such a way that on the surface of the shaped body a plurality of closely spaced parallel grooves running side by side, are created. The peeling knife arranged to follow the scratching tool does not peel off a continuous foil, but instead peels off a curtain of parallel single threads that are subsequently stretched and coiled or are possibly cut to staple fibers. The pressure of attack of the scratching tool is suitably adjusted in such a way that the scratching depth is somewhat deeper than the peeling depth.

Preferably a total scretching ratio lying between 1:2 and 1:8 is used.

Suitably the curtain of threads is heated by means of heating bows, by hot air, steam, high-boiling liquids, or the like, wherein, according to the type of synthetic material used, the temperature of the heating medium is kept between 100° and 450° C.

Advantageously the thickness of the peeled foil or threads, respectively, is to be 0.005 to 0.02 mm. single-threaded titers (thicknesses) of e.g. 3 to 7 dtex (1 dtex = 0.9 denier) can be produced uniformly, reliably and safely. The scratching tools can be used over a long period without any fault occurring; they have a very good resistance to wear.

The invention also comprises a device for carrying out the above-described method. The device comprises a turning mechanism, in particular a lathe, onto whose spindle a cylindrically-shaped body of synthetic material can be stuck, and a lathe carriage to which a foil-peeling knife is fastened. According to the invention a scratching tool with scratching edges parallel to each other and located in the circumferential direction of the scratching tool is arranged to precede the peeling knife. The distance between the scratching edges suitably amounts to 0.05 to 2 mm. behind the peeling knife, guiding and transporting devices are arranged for removing the peeled-off thread curtain and additionally a one-step or a multiple-step stretching device and possibly a cutting device are arranged after the guiding devices.

The scratching tool may suitably be a packet of razor blades or a steel band with sawtooth-like scratching edges. As a scratching tool one may also use a roller with peripherally running scratching edges.

BRIEF DESCRIPTION OF THE INVENTION

The invention will now be described by way of example with reference to the accompanying drawings, in which FIG. 1 is a schematic illustration of the method, FIG. 2 illustrates the creation of the threads, and FIGS. 2*a* and 2*b* show scratching tools on an enlarged scale.

DESCRIPTION OF EXEMPLARY EMBODIMENTS

A cylindrical block 1 of synthetic material, in particular of sintered polytetrafluorethylene, is placed on the spindle of a lathe and is fixed thereto. The lathe is provided with an automatic revolution-measuring instrument, so that the circumferential speed of the block can be kept constant regardless of the block radius. To the lathe carriage a peeling knife 3 is secured. The knife, depending on the adjustment of its position, is capable of peeling off foils of a certain thickness (preferably from 0.005 to 0.02 mm). Such foil-peeling machines comprising a lathe and a peeling knife are known per se.

Figure 1:
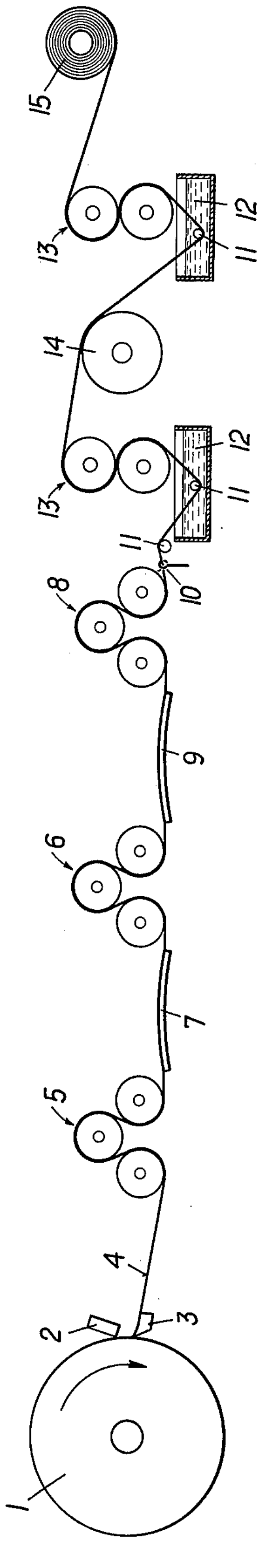
Figure 2:
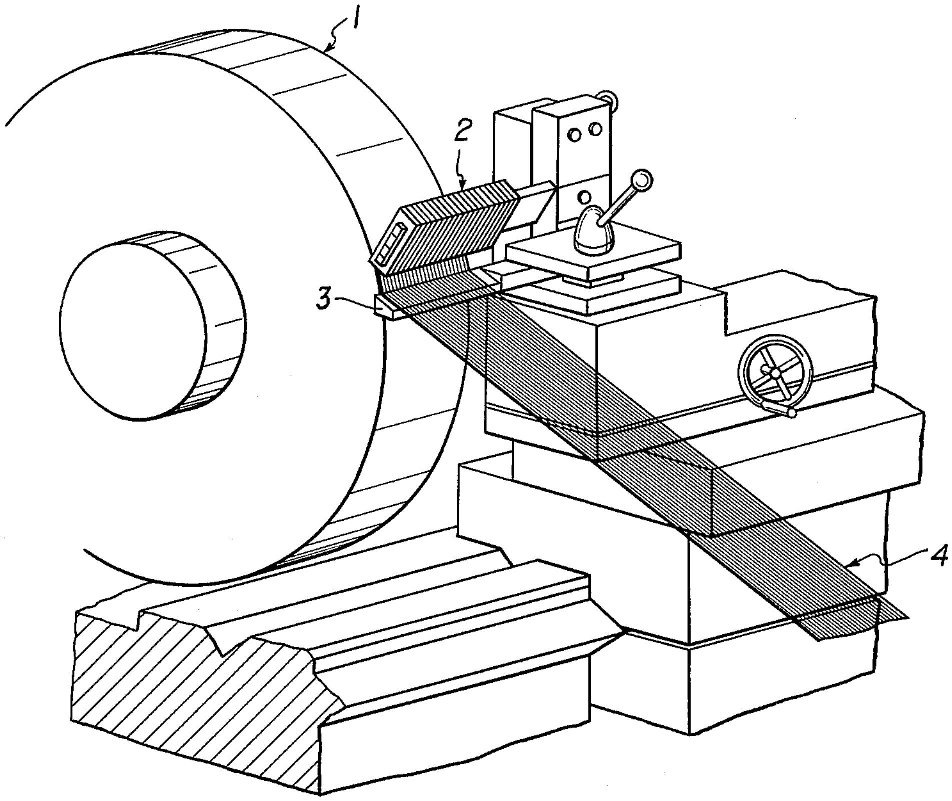
Figure 2A:
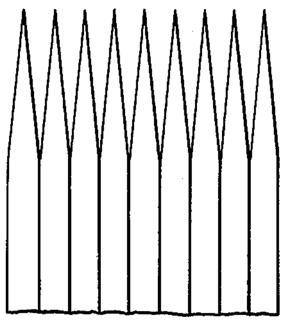
Figure 2B:
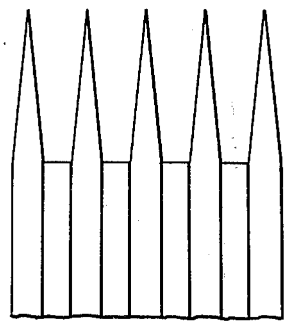

According to the invention a scratching tool is arranged, in front of the line of contact of the peeling knife. In a way not illustrated in detail, the knife is capable of being swung or adjusted in relation to the surface of the cylindrical block of synthetic material. In the embodiment according to FIG. 2 a packet of razor blades is used as the scratching device 2, the distance between the individual cutting edges of the blades being 0.05 to 2 mm. The circumferential speed of the block is variable and preferably lies between 20 to 50 m/min. Instead of a razor-blade packet one may also use steel bands having a sawtooth-like profile, as is illustrated in FIGS. 2*a* and 2*b*. When the scratching device is swung against the cylinder, parallel/grooves are scratched into the surface of the cylinder, which grooves are somewhat deeper than the depth of the foil to be peeled off so that a curtain of parallel threads 4 forms behind the peeling knife 3. This thread curtain is fed to a three-high roller arrangement 5, which at the same time serves as a conveyor for the subsequent stretching procedure. The main stretching of the thread curtain, preferably at a ratio of 1:4, occurs between the three-high roller arrangement 5 and a three-high roller arrangement 6 while the thread is being guided over a heating bow 7. Thereafter a subsequent stretching of the thread curtain is carried out between the three-high roller arrangement 6 and another three-high roller arrangement 8 while being passed over a heating bow 9. The stretching ratio is preferably 4:4.2 in this second stretching zone. Behind the three-high roller arrangement 8 the thread curtain is combined by means of a thread guide 10 to form a cable and when producing dry silk yarn the cable is fed directly to the reel 15. If, according to a modified embodiment of the invention, impregnated yarn is produced, prior to being wound up, the cable is passed through one or two impregnating devices, comprising deflection bars 11, a dipping bath 12, a two-high presser arrangement 13 and a dry reel 14.

The method of the invention is illustrated in more detail by the following examples:

EXAMPLE 1

From a 100 mm wide cylindrical sintered block of polytetrafluorethylene, after scratching the cylindrical surface with a sawtooth-like scratching tool having a tooth-point distance of 0.25 mm, 400 threads having a thickness of 0.020/mm are peeled off at a speed of 40m/min. They are stretched in two steps at temperatures lying between 250° and 380° C, at a total stretching ratio of 1:4.2. Thus, a white polytetrafluorethylene yarn is obtained, which has a yarn titer (thickness) of 10,000 dtex and a single-thread titer of 25 dtex.

EXAMPLE 2

From a 100 mm wide cylindrical sintered block of polytetrafluorethylene, after scratching the cylindrical surface with a sawtooth-like scratching device, having a tooth-point distance of 0.125 mm, 800 threads having a thickness of 0.010 mm are peeled off at a speed of 50 m/min. They are subdivided into four equal size thread curtains and are stretched in two steps at temperatures ranging from 250° to 380° C at a total rtio of 1:5.3. The stretched threads are wound up on 4 reels at a speed of 265 m/min. Thus four identical white yarns are obtained, which have yarn titers of 1000 dtex and single-thread titers of 5 dtex.

EXAMPLE 3

From a 100 mm wide cylindrical sintered block of polytetrafluorethylene, after scratching the cylindrical surface with a sawtooth-like scratching device, having a tooth-point distance of 0.10 mm, 1000 threads having a thickness of 0.008 mm are peeled off at a speed of 30 m/min. The threads are next stretched in two steps at temperatures ranging between 250° and 380° C at a total ratio of 1:4.2 and are wound up at a speed of approx. 125 m/min. Thus a white polytetrafluorethylene yarn is obtained, which has a yarn titer of 4000 dtex and a single-thread titer of 4 dtex.

By the method of the present invention it is possible to produce defined threads of a uniform titer or, if desired, of small titers without entanglements. Threads of special polymers, in particular polymers resistant to temperature and especially to chemicals and having a high resistance to tearing can be produced, which threads are excellently suited for technical usage. For certain fields of application the threads may be impregnated with certain preparations.

What we claim is:

1. A method of producing threads and fibers of synthetic polymer materials. which have high-melting points, which hve no melting point, which are difficult to dissolve or which are insoluble, comprising the steps of:

rotating a cylindrically shaped body of said synthetic material against a scratching tool carrying a plurality of scratching edges so as to scratch a plurality of parallel grooves into the surface of the cylindrically shaped body, holding a peeling knife against said cylindrically shaped body, said knife being arranged to follow said scratching tool in the direction of rotation of said cylindrically shaped body of synthetic material so as to peel off a curtain of parallel threads from the scratched surface of the cylindrically shaped body, and stretching said peeled off curtain of parallel threads in at least one step.

2. A method as set forth in claim 1, wherein the synthetic material is polytetrafluorethylene.

3. A method as set forth in claim 1, wherein said peeled off curtain is stretched in a plurality of steps.

4. A method as set forth in claim 1, wherein a total stretching ratio of between 1:2 and 1:8 is applied.

5. A method as set forth in claim 1, wherein the curtain of parallel threads is heated while being stretched.

6. A method as set forth in claim 5, wherein the curtain of parallel threads is heated by a heating medium having a temperature of between 100° and 450° C.

7. A method as set forth in claim 5, wherein the curtain of parallel threads is heated by means of a heating bow.

8. A method as set forth in claim 5, wherein the curtain of parallel threads is heated by hot air.

9. A method as set forth in claim 5, wherein the curtain of parallel threads is heated by steam.

10. A method as set forth in claim 5, wherein the curtain of parallel threads is heated by high-boiling liquids.

11. A method as set forth in claim 1, further including the step of cutting the threads to obtain staple fiber.

12. A method as set forth in claim 1, further including the step of grinding the threads to obtain a short-staple floccule.

* * * * *

UNITED STATES PATENT AND TRADEMARK OFFICE

CERTIFICATE OF CORRECTION

PATENT NO. : 4,025,598

DATED : May 24, 1977

INVENTOR(S) : Franz Sasshofer et al

It is certified that error appears in the above-identified patent and that said Letters Patent are hereby corrected as shown below:

First page, Item 73, "Chemigfaser" should read --Chemiefaser--;
line 10 of Abstract, after "method" delete the comma.

Col. 2, line 16, "scretching" should read --stretching--;
lines 24 & 25, "single-threaded" should read --Single-thread--;
line 40, "behind" should read --Behind--;
line 50, "INVENTION" should read --DRAWINGS--.

Col. 3, line 17, "parallel/grooves" should read --parallel grooves--;
line 27, after "thread" insert --curtain--;
line 50, "0.020/mm" should read --0.020 mm--;
line 64, "rtio" should read --ratio--.

Col. 4, line 11, "125" should read --126--;
line 25, "hve" should read --have--.

Signed and Sealed this

*Twentieth* Day of *September 1977*

[SEAL]

*Attest:*

RUTH C. MASON
*Attesting Officer*

LUTRELLE F. PARKER
*Acting Commissioner of Patents and Trademarks*